United States Patent
Fitch et al.

(10) Patent No.: US 10,194,474 B2
(45) Date of Patent: Jan. 29, 2019

(54) COMMUNICATIONS NETWORK

(71) Applicant: British Telecommunications Public Limited Company, London (GB)

(72) Inventors: Michael Fitch, London (GB); Richard MacKenzie, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/553,708

(22) PCT Filed: Feb. 16, 2016

(86) PCT No.: PCT/EP2016/053286
§ 371 (c)(1),
(2) Date: Aug. 25, 2017

(87) PCT Pub. No.: WO2016/146328
PCT Pub. Date: Sep. 22, 2016

(65) Prior Publication Data
US 2018/0054840 A1    Feb. 22, 2018

(30) Foreign Application Priority Data
Mar. 19, 2015  (EP) .................................... 15275077

(51) Int. Cl.
*H04W 76/11*    (2018.01)
*H04W 76/10*    (2018.01)
(Continued)

(52) U.S. Cl.
CPC ........... *H04W 76/11* (2018.02); *H04W 76/10* (2018.02); *H04W 84/045* (2013.01);
(Continued)

(58) Field of Classification Search
None
See application file for complete search history.

(56) References Cited

U.S. PATENT DOCUMENTS

2010/0120447 A1   5/2010  Anderson et al.
2010/0157911 A1*  6/2010  Hegde ............... H04L 5/0007
                                                      370/329
(Continued)

FOREIGN PATENT DOCUMENTS

CN    105611554 A    5/2016
EP    2 154 917 A1   2/2010
(Continued)

OTHER PUBLICATIONS

International Search Report for corresponding International Application No. PCT/EP2016/053286 dated Apr. 11, 2016; 4 pages.
(Continued)

*Primary Examiner* — Otis L Thompson, Jr.
(74) *Attorney, Agent, or Firm* — Amy M. Salmela; Patterson Thuente Pedersen, P.A.

(57) ABSTRACT

This disclosure provides a method for establishing a connection between a first and second base station, and a base station implementing the method, the method including: a first base station receiving an identifier for a second base station and an identifier for a second wireless networking module associated with the second base station; based on the identifiers for the second base station and the second wireless networking module, determining if a first wireless networking device associated with a first base station is communicatively connectable to the second wireless networking device associated with a second base station; and the first base station establishing a cellular connection with the second base station using the identifiers for the second base station and associated second wireless networking module.

16 Claims, 5 Drawing Sheets

(51) Int. Cl.
   *H04W 84/04*     (2009.01)
   *H04W 84/12*     (2009.01)
   *H04W 92/20*     (2009.01)
   *H04W 88/08*     (2009.01)

(52) U.S. Cl.
   CPC ............ *H04W 84/12* (2013.01); *H04W 88/08* (2013.01); *H04W 92/20* (2013.01)

(56) References Cited

U.S. PATENT DOCUMENTS

| | | | |
|---|---|---|---|
| 2010/0178912 | A1 | 7/2010 | Gunnarsson et al. |
| 2011/0190027 | A1 | 8/2011 | Michel et al. |
| 2011/0274030 | A1 | 11/2011 | Wang et al. |
| 2012/0002537 | A1* | 1/2012 | Bao ....................... H04W 24/04 370/221 |
| 2012/0026865 | A1 | 2/2012 | Fan et al. |
| 2012/0257495 | A1* | 10/2012 | Schwarz ............. H04L 41/0668 370/228 |
| 2012/0264418 | A1 | 10/2012 | Lee et al. |
| 2012/0275315 | A1 | 11/2012 | Schlangen et al. |
| 2013/0035033 | A1* | 2/2013 | Sanneck ............... H04W 24/04 455/9 |
| 2013/0084873 | A1 | 4/2013 | Sharony et al. |
| 2014/0071891 | A1 | 3/2014 | Zhou et al. |
| 2014/0092765 | A1 | 4/2014 | Agarwal et al. |
| 2014/0187236 | A1* | 7/2014 | Chiang ................ H04W 24/04 455/423 |
| 2014/0269547 | A1 | 9/2014 | Valliappan et al. |
| 2015/0063136 | A1 | 3/2015 | Shen et al. |
| 2015/0092552 | A1 | 4/2015 | Bajj et al. |
| 2015/0131524 | A1 | 5/2015 | Cavalcante et al. |
| 2015/0271714 | A1* | 9/2015 | Shetigar ............ H04W 36/0061 370/255 |
| 2016/0285676 | A1* | 9/2016 | Kerpez ................. H04M 3/304 |
| 2017/0303188 | A1 | 10/2017 | Fitch et al. |
| 2018/0262922 | A1 | 9/2018 | MacKenzie et al. |

FOREIGN PATENT DOCUMENTS

| | | | |
|---|---|---|---|
| EP | 2271142 | A1 | 1/2011 |
| EP | 2 814 279 | A1 | 12/2014 |
| WO | WO 2010/024743 | A1 | 3/2010 |
| WO | WO 2011/028158 | A1 | 3/2011 |
| WO | WO 2013/071813 | A1 | 5/2013 |
| WO | WO 2013/120274 | A1 | 8/2013 |
| WO | WO 2013/142361 | A1 | 9/2013 |
| WO | WO 2015/034775 | A1 | 3/2015 |
| WO | WO 2016/146328 | A1 | 9/2016 |
| WO | WO 2017/148752 | A1 | 9/2017 |
| WO | WO 2017/157585 | A1 | 9/2017 |

OTHER PUBLICATIONS

Written Opinion of the International Searching Authority for corresponding International Application No. PCT/EP2016/053286 dated Apr. 11, 2016; 7 pages.
International Preliminary Report on Patentability for corresponding International Application No. PCT/EP2016/053286 dated Feb. 6, 2017; 14 pages.
Extended European Search Report for corresponding EP Application No. 15275077.4 dated Sep. 4, 2015; 8 pages.
Codan Radio, "RF Link Controlled Base Station," Codan Radio Communications https://www.codanradio.com/product/rf-link-controlled-base/ Accessed on Aug. 8, 2017; 2 pages.
3rd Generation Partnership Project, "3GPP 36.420 v8.0.0 Technical Specification; X2 general aspects and principals (Release 8)," (Dec. 2007) http://www.qtc.jp/3GPP/Specs/36420-800.pdf ; 11 pages.
Application and Filing Receipt for U.S. Appl. No. 15/762,022, filed Mar. 21, 2016, Inventor(s): MacKenzie et al.
Wu et al., Hai Jiang Yi; "Physical Cell Identity Self-Organization for Home eNodeB Deployment in LTE"; Nokia Siemens Networks; 978-1-4244-3709-2/10; 2010 IEEE; Beijing China; 6 pages.
International Search Report and the Written Opinion of the International Searching Authority for PCT Application No. PCT/EP2016/069745, dated Nov. 11, 2016, 11 pages.
International Preliminary Report on Patentability for PCT Application No. PCT/EP2017/052738 dated Jun. 22, 2018; 27 pages.
International Search Report and Written Opinion for PCT Application No. PCT/EP2017/052738 dated Mar. 27, 2017; 20 pages.
Written Opinion for PCT Application No. PCT/EP2017/052738 dated Feb. 15, 2018; 12 pages.
European Search Report for EP Application No. 16160809.6 dated Sep. 26, 2016; 14 pages.
UK Examination Report for GB Patent Application No. GB1604515.5, dated May 11, 2017, 1 pages.
UK Examination Report for GB Patent Application No. GB1604515.5, dated Jan. 31, 2018, 3 pages.
UK Intention to Grant for GB Patent Application No. GB1604515.5, dated May 11, 2018, 2 pages.
UK Combined Search and Examination Report for GB Patent Application No. GB1604515.5, dated Sep. 9, 2016, 3 pages.
Younis, et al.; Military Communications; "Cognitive MANET Design for Mission-Critical Networks", IEEE Communications Magazine, Oct. 2009; 0163-6804/09 2009 IEEE; 5 pages.
3rd Generation Partnership Project; Technical Specification Group Services and System Aspects; Telecommunication Management; "Study on Management of Evolved Universal Terrestrial Radio Access Network (E-UTRAN) and Evolved Packet Core (EPC)"; Release 8 3GPP TR 32.816 V8.0.0 (Dec. 2008) Technical Report; Valbonne—France; 38 pages.
Qualcomm Technologies, Inc,; "LTE Small Cell SON Test Cases Functionality and Interworking"; Jun. 5, 2015; Qualcomm Technologies, Inc. 5775 Morehouse Drive San Diego, CA 92121 U.S.A.; 82 pages.
International Search Report and Written Opinion for PCT Application No. PCT/EP2017/053957 dated Jul. 23, 2017; 11 pages.
European Search Report for EP Application No. 16158665.6 dated Sep. 13, 2016; 6 pages.
GB Combined Search and Examination Report for GB Application No. GB1603748.3; dated Aug. 26, 2016; 6 pages.
Mukhopadhyay et al.; "Novel RSSI Evaluation Models for Accurate Indoor Localization with Sensor Networks"; 978-1-4799-2361-8/14; 2014 IEEE; Bharti School of Telecommunication Technology and Management IIT Delhi Hauz Khas, New Delhi; 6 pages.
3rd Generation Partnership Project; Technical Specification Group Radio Access Network; Evolved Universal Terrestrial Radio Access (E-UTRA); Radio Frequency (RF) system scenarios (Release 9) 3GPP TR 36.942 V9.3.0 (Jun. 2012); 83 pages.
MacQueen, J. "Some Methods for Classification and Analysis of Multivariate Observations"; Fifth Berkeley Symposium; University of California, Los Angeles (1967). pp. 281-297 (17 pages total).
NGNM the engine of broadband wireless innovation "Recommended Practices for multi-vendor SON deployment" Deliverable D2 Version 1.0 by NGNM Alliance; Reading Bridge House George Street Reading Berkshire RG1 8LS UK; Jan. 28, 2014; 30 pages.
Small Cell Forum Release 9.0; Document I76.09.01 LTE small cell SON test cases: Functionality and interworking; version 176.09.01; Feb. 21, 2017; 95 pages.
Fairbrother et al., "A Two-Level Graph Partitioning Problem Arising in Mobile Wireless Communications"; arXiv:1705.08773v1 [math.OC] May 24, 2017; 23 pages.
Web article, "DSDP", NEOS Interfaces to DSDP http://www.mcs.anl.gov/DSDP; retrieved Jul. 3, 2017; 4 pages.
Web article, "Welcome to CVXPY" Welcome to CVXPY—CVXPY 0.4.9 documentation, retrieved Jul. 3, 2017; http://www.cvxpy.org/en/latest; 1 page.
Ghaddar et al., "A branch-and-cut algorithm based on semidefinite programming for the minimum k-parition problem"; Ann Oper Res DOI 10 1007/s10479-008-0481-4; Springer Science+Business Media, LLC 2008; Published online Dec. 3, 2008; 20 pages.
Rendl, F., "Semidefinite Relaxations for Partitioning, Assignment and Ordering Problems"; Cross Mark, Ann Oper Res (2016) 240 119-140 DOI 10 1007/s10479-015-2015-1; Published online Sep. 15, 2015; Springer Science+Business Media New York 2015; 22 pages.

(56) References Cited

OTHER PUBLICATIONS

Carlson et al., "Scheduling to Minimize Interaction Cost"; The Johns Hopkins University, Baltimore, Maryland; Jun. 2, 1965; 8 pages.
Ning et al., "Fuzzy layered physical cell identities assignment in heterogeneous and small cell networks"; Electronics Letters May 12, 2016, vol. 52 No. 10, pp. 879-881; 2 pages.
European Search Report for EP Application No. 17180358.8; dated Jan. 31, 2018; 5 pages.
GB Search and Examination Report for GB Application No. GB1710989.3; dated Dec. 1, 2017; 5 pages.
EP Search Report for EP Application No. 15187067.2; dated Mar. 18, 2016; 8 pages.
GB Examination Report for GB Application No. 1517069.9; dated Jan. 31, 2018; 3 pages.
GB Search Report for GB Application No. 1517069.9; dated Mar. 7, 2016; 4 pages.
International Preliminary Report on Patentability for PCT Application No. PCT/EP2016/069745, dated Oct. 20, 2017, 14 pages.
Application as filed for U.S. Appl. No. 16/082,870, filed Sep. 6, 2018, Inventor(s): MacKenzie et al.
Application as filed for U.S. Appl. No. 16/079,327, filed Aug. 23, 2016, Inventor(s): Briggs et al.
Application and Filing Receipt for U.S. Appl. No. 16/023,917, filed Jun. 29, 2018, Inventor(s): MacKenzie et al.

\* cited by examiner

COMMUNICATIONS NETWORK

CROSS-REFERENCE TO RELATED APPLICATIONS

The present application is a National Phase entry of PCT Application No. PCT/EP2016/053286, filed on 16 Feb. 2016, which claims priority to EP Patent Application No. 15275077.4, filed on 19 Mar. 2015, which are hereby fully incorporated herein by reference.

TECHNICAL FIELD

The present disclosure relates to a communications network. In particular, this disclosure relates to a method and apparatus for establishing a connection between a first and second base station in a communications network.

BACKGROUND

A modern telecommunications device may support and implement many different network technologies. For example, a modern Customer Premises Equipment (CPE) is configured to communicate with User Equipment (UE) using Ethernet, Wireless Local Area Networks (WLAN, most commonly Wi-Fi as defined in the IEEE 802.11 family of standards) and cellular radio access technologies. CPEs which implement cellular radio access technology (such as the Long-Term Evolution (LTE) $4^{th}$ Generation (4G) technology) are often known as small cells or Home eNodeBs, but may also be known as femtocells, picocells or microcells depending on their coverage area.

An example arrangement of two dwellings each served by their own CPE is shown in FIG. 1. As shown, each CPE includes a small cell (marked as "LTE"), a WLAN, a router and a DSL modem, either as part of the same device or communicatively attached. UEs within each house may communicate with their respective CPEs using either a wired Ethernet connection to the router, or wirelessly using either a cellular or WLAN communication method to the small cell or WLAN part of the CPE respectively. FIG. 1 illustrates two neighboring dwellings which are in close proximity with each other. Accordingly, the coverage areas of the small cell and WLAN parts of the CPEs (i.e. the areas covered by cellular or WLAN transmissions from the CPE) include the neighboring dwelling. It is therefore possible for a UE to be served by either CPE via cellular or WLAN access technologies so long as the UE has the correct access rights.

The CPE's Digital Subscriber Line (DSL) modem connects the CPE, and all UEs using that CPE, to the Core Network (including the network's Mobility Management Entity (MME) and Serving Gateway (S-GW) using the S1 interface) and external networks such as the Internet. This external connection is known as the backhaul. Each CPE's small cell may also communicate with neighboring small cells over the backhaul connection using the X2 interface. To set up an X2 connection between the two CPE's small cells, one small cell must determine the IP address of the other. This is typically accomplished in two stages. Firstly, the small cell determines identifying information of its neighboring small cells by either directly monitoring it through a Network Listen function, or by using an attached UE to report the presence of neighbors. These methods allow the small cell to determine the Cell Global Identifier (CGI) of neighboring CPEs, along with further measurements (such as signal strength). Once the small cell has determined which neighboring cell it wants to connect to, it requests the IP address of the neighboring cell from the MME over the S1 interface. The two small cells may then establish a connection over the X2 interface by transferring X2 setup messages.

Once two small cells are connected over the X2 interface, control plane traffic may be transferred between the two, which is typically used for fast transfer of handover information (such as when a UE disconnects from one CPE and connects to the other CPE), or for radio resource management. Data packets can also be forwarded over the X2 interface to bridge the delays in handover for non-real-time data. This X2 traffic is typically routed between the two small cells via an IPsec tunnel (in a similar manner to the tunnel used for the S1 interface).

In the event the CPE loses its backhaul connection, a large amount of functionality is lost. For example, the CPE, and all connected users, may no longer connect to external networks such as the Internet. This is true for both the cellular and WLAN access technologies. Furthermore, the CPE also cannot connect to other network elements, such as the S-GW or MME via the S1 interface, or other small cells via any existing X2 interfaces. It is also not possible for the CPE to establish any new X2 connections with any other small cells, as it is not possible for the CPE to establish the IP address without a backhaul connection to the MME. Thus, failure of the CPE's backhaul results in a frustrating period for the user during which they are stuck with a very limited service (typically just the routing functions of the CPE within its own network) until the backhaul is fixed.

It is therefore desirable to alleviate at least some of the above problems.

SUMMARY

According to a first aspect of the disclosure, there is provided a method for establishing a connection between a first and a second base station, the method comprising: a first base station receiving an identifier for a second base station and an identifier for a second wireless networking module associated with the second base station; based on the identifiers for the second base station and the second wireless networking module, determining if a first wireless networking device associated with a first base station is communicatively connectable to the second wireless networking device associated with a second base station; and the first base station establishing a cellular connection with the second base station using the identifiers for the second base station and associated second wireless networking module.

In embodiments of the disclosure, a first and second base station are each associated with first and second wireless networking devices having overlapping coverage areas. The first and second wireless networking devices may therefore establish a wireless networking connection with each other, which may then be used as part of a cellular connection between the associated first and second base stations. This enables the two base stations to establish a cellular connection using a wireless networking connection, which will typically experience much less latency compared to the conventional backhaul.

Before establishing a cellular connection with the first base station, the first CPE may determine the Quality of Service (QoS) of the cellular connection between the first and second base stations over a wireless networking connection. The CPE may then establish the cellular connection over the wireless networking connection if the QoS is above a threshold, or alternatively it may establish the cellular connection via the backhaul if the QoS is below the threshold. The CPE therefore establishes a cellular connection having the greatest QoS in the circumstances.

The method may further comprise: the first wireless networking device receiving a first wireless networking signal from a second wireless networking device, the first wireless networking signal including an identifier for the second base station associated with the second wireless networking device. Alternatively, the method may further comprise: the first base station receiving a cellular signal from a second base station, the cellular signal including an identifier for the second wireless networking device associated with the second base station. Using either technique, the first base station may thus determine if it can establish a cellular connection with the second base station via a wireless networking connection between the first and second wireless networking devices.

The identifier may be an Internet Protocol (IP) address for the second base station. In this scenario, the first base station may determine the IP address of the second base station without having to query the Mobility Management Entity (MME). This allows the first base station to establish a cellular connection with the second base station (over the wireless networking connection between the first and second wireless networking devices) without using the backhaul. The first base station may therefore connect to other CPEs and their respective backhauls even when its own backhaul is out of service, allowing it to connect to the Core Network and other networks such as the Internet. This provides a level of resilience in the network as the user may still gain access to external networks, such that fixing backhaul failures are not as urgent. This also allows Network Operators to connect to the user's CPE and diagnose any problems it may be experiencing connecting to external networks via its own backhaul.

According to a second aspect of the disclosure, there is provided a first base station comprising a transceiver adapted to receive an identifier for a second base station and an identifier for a second wireless networking module associated with the second base station; and a processor adapted to determine if a first wireless networking device associated with the first base station is communicatively connectable to the second wireless networking device associated with the second base station, wherein the transceiver is further adapted to establish a cellular connection with the second base station using the identifiers for the second base station and associated second wireless networking module.

The transceiver may be adapted to send data for the cellular connection to the first wireless networking device for transmission over a wireless networking connection between the first and second wireless networking devices.

The processor may be adapted to determine a Quality of Service (QoS) of the cellular connection with the second base station over the wireless networking connection.

The transceiver may be adapted to send data for the cellular connection to the first wireless networking device for transmission over the wireless networking connection between the first and second wireless networking devices if the QoS is above a threshold.

The processor may be adapted to determine a Quality of Service (QoS) of the cellular connection with the second base station over the wireless networking connection, and the transceiver may be adapted to send data for the cellular connection with the second base station over a backhaul connection if the QoS is below a threshold.

The transceiver may be adapted to receive a cellular signal from a second base station, the cellular signal including an identifier for the second wireless networking device associated with the second base station.

A Customer Premises Equipment (CPE) may comprise the base station of the second aspect of the disclosure, and the first wireless networking device, wherein the first wireless networking device may include a transceiver adapted to receive a wireless networking signal from a second wireless networking device, the wireless networking signal including an identifier for the second base station associated with the second wireless networking device; and memory adapted to store the identifier for the second base station.

A non-transitory computer-readable storage medium storing a computer program or suite of computer programs is also provided, which upon execution by a computer system performs the method of the first aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
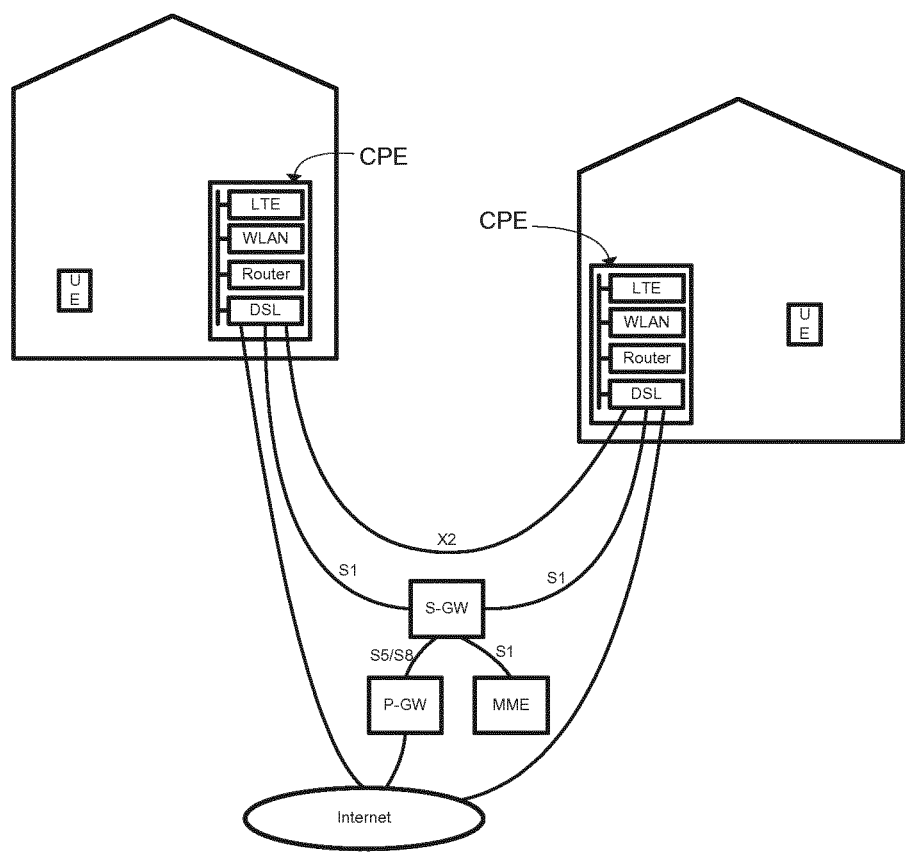
FIG. 1 illustrates a conventional arrangement of two dwellings containing two Customer Premises Equipment (CPE).
Figure 2:
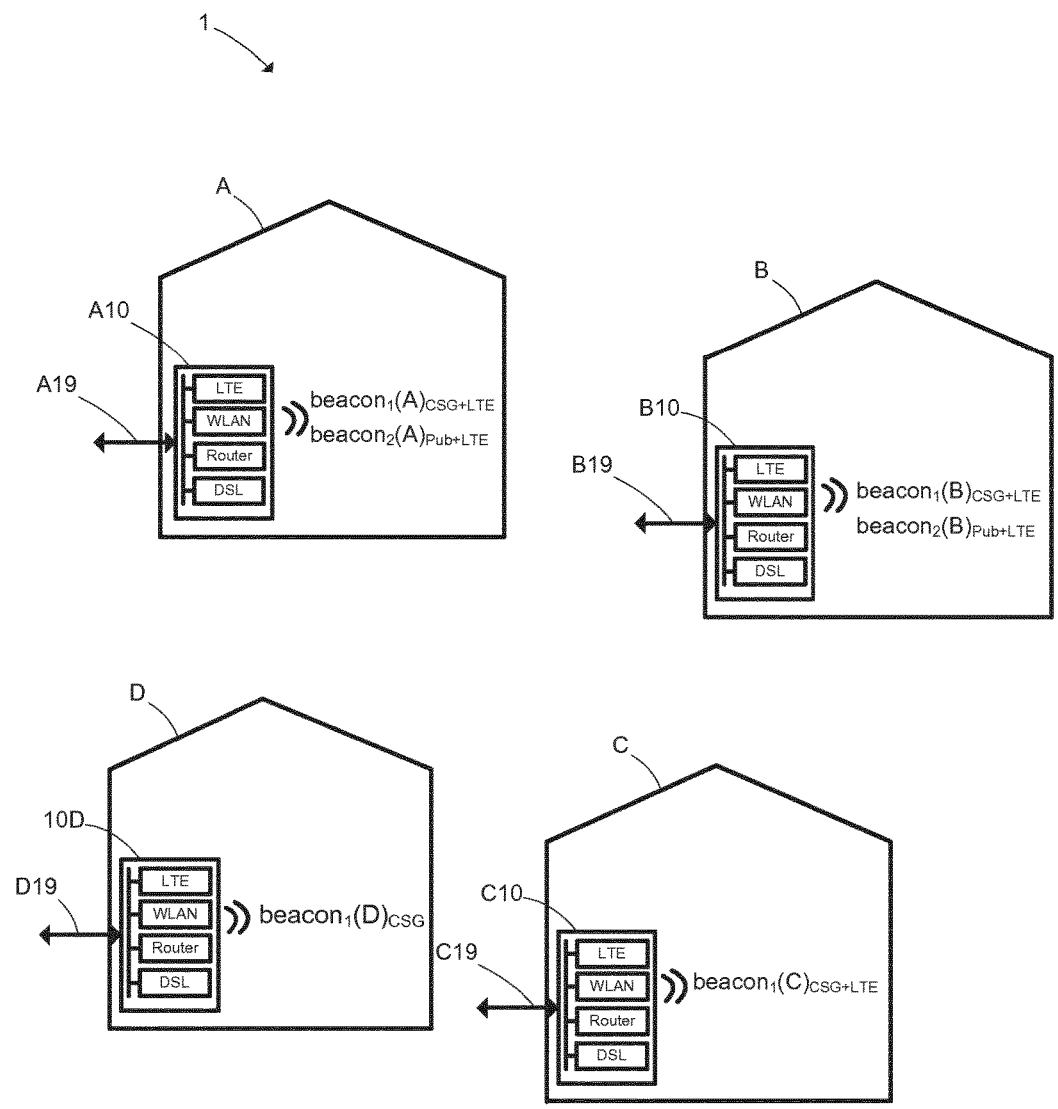
FIG. 2 illustrates a communications network of an embodiment of the present disclosure, including four dwellings each having a Customer Premises Equipment.

A first embodiment of a communications network 1 of the present disclosure will now be described with reference to FIGS. 2-4. The communications network 1 comprises a plurality of dwellings A to D, having a first, second, third and fourth Customer Premises Equipment (CPE) A10, B10, C10, D10 respectively. Before discussing this arrangement further, the CPEs will be described in more detail with reference to FIG. 3.

Figure 3:
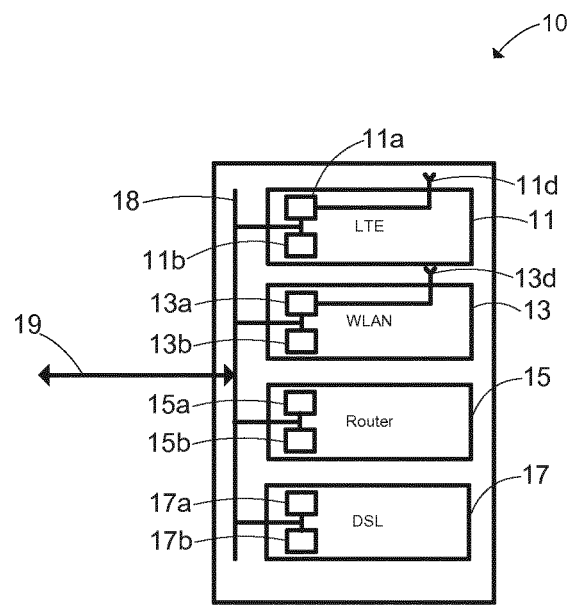
FIG. 3 illustrates a CPE of FIG. 2.

As shown in FIG. 3, a CPE 10 of this embodiment of the disclosure comprises a plurality of modules, including a cellular module (labeled 'LTE') 11, Wireless Local Area Network (WLAN) module 13, a router module 15 and a DSL modem module 17. Each module includes its own processing module 11a, 13a, 15a, 17a and memory module 11b, 13b, 15b, 17b, and are communicatively coupled by a bus 18 to each other and to a backhaul connection 19.

The cellular module 11 acts as a small cell (also known as "femtocell", "picocell", or "metrocell" depending on its coverage area), to provide cellular communications to User Equipment (UE) in the coverage area of the cellular module. Accordingly, the cellular module 11 includes a transceiver 11d, coupled to the processor 11a, to send and receive cellular signals. In this embodiment, the cellular module 11 is configured for communications using the Long Term Evolution (LTE) $4^{th}$ Generation (4G) protocol.

The WLAN module 13 provides wireless communications to UEs in its coverage area. The WLAN module 13 therefore also includes a transceiver 13d, coupled to the processor 13a, to send and receive wireless signals. In this embodiment, the WLAN module 13 is configured for communications using any one of the IEEE 802.11 family of standards (commonly known as "Wi-Fi").

The router module 15 is configured to route data packets between the various modules and between UEs connected to any one of the modules, and works in accordance with conventional routing devices. Similarly, the DSL module 17 is configured to modulate and demodulate signals sent/received via the backhaul 19 in a conventional manner, which are then routed between the modules of the CPE and any UEs connected thereto by the router module 15.

The various modules of the CPE 10 provide a multitude of connectivity options between UEs and other entities in the network 1. For example, the cellular module 11 provides cellular connectivity between any UE connected to that module and the backhaul 19 (providing voice and data communications with other UEs, CPEs and networks), and also cellular connectivity between that module and any other cellular module of another CPE (i.e. using an X2 interface) or other entities in the Core Network (e.g. a Mobility Management Entity (MME) using an S1 interface). The WLAN module 13 provides wireless connectivity to any UE connected to that module. When combined with the router module 15, this allows UEs connected to the WLAN module 13 to form a wireless network. When combined with the DSL module 17, this allows UEs connected to the WLAN module 13 to communicate with external networks (such as the Internet).

In order to communicate with a UE or another CPE, the modules of the CPE 10 must identify themselves. This is achieved in different ways depending on the module.

The cellular module 11 of the CPE 10 includes several identifying parameters. Firstly, the cellular module 11 has a Cell Global Identifier (CGI, or eCGI in LTE). The eCGI is a fifteen digit code used to uniquely identify the cellular module 11 from any other base station in the communications network 1 (e.g. the cellular modules of any other CPE, and any other small cell or macrocell in the network 1). Secondly, the cellular module 11 has a Physical Cell ID (PCI), being a number between 0 and 503 which identifies the cellular module 11 at a more local level (i.e. the aim of network planning is to distribute PCI values such that a base station does not have the same PCI value as a neighbor or a neighbor's neighbor). Thirdly, the cellular module 11 of the CPE 10 has an IP address. These identifiers are all stored in memory 11b.

The WLAN module 13 of the CPE 10 has a Media Access Control (MAC) address as a unique identifier for that module in the network. In a typical arrangement, the WLAN module 13 acts as an access point to all UEs in its network (thus forming a Basic Service Set (BSS)). The WLAN module 13 transmits a beacon frame including a Basic Service Set Identification (BSSID), which is the MAC address of the WLAN module 13, to allow UEs to identify and connect to it. An informal Server Set Identification (SSID) is the user friendly name transmitted with the BSSID, allowing the user to quickly select the correct SSID thus causing the UE to connect to the WLAN module 13 having the corresponding BSSID (i.e. MAC address).

Figure 4:
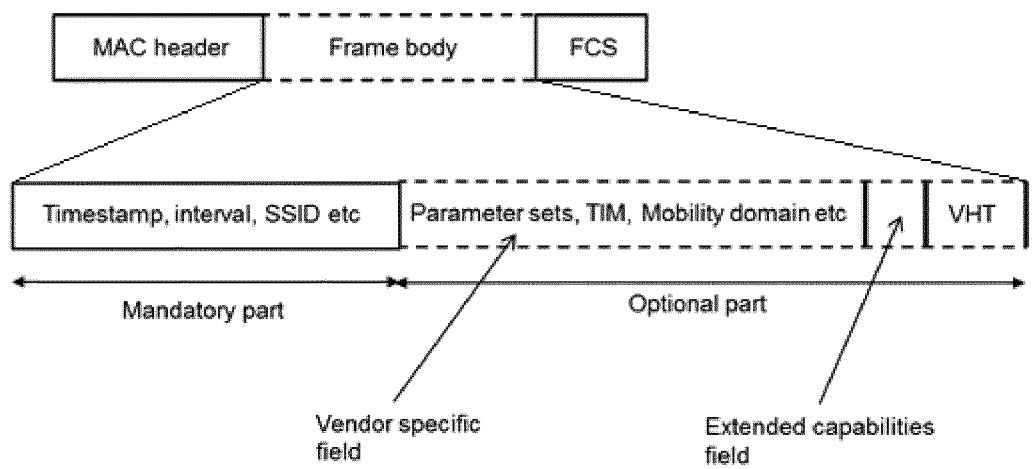
FIG. 4 is schematic diagram of a beacon frame transmitted by a CPE of FIG. 1.
Figure 5:
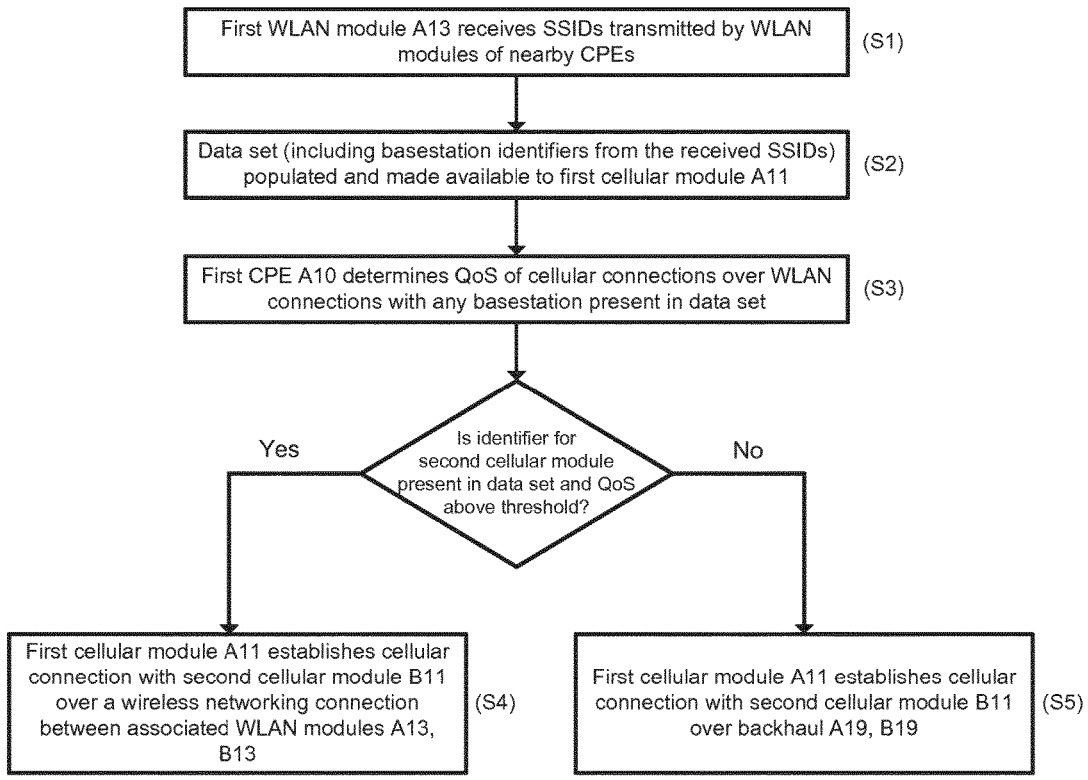
FIG. 5 is a flow diagram illustrating an embodiment of a method of the present disclosure.

The structure of the beacon frame is shown in FIG. 4. The frame body of the beacon frame includes the SSID field, which is a single field having a variable size between 0 and 32 bytes. The beacon frame also includes 'vendor specific' or 'extended capabilities' fields, which are configurable and may contain other data relating to the service set or the particular WLAN module transmitting the beacon frame. For example, the extended capabilities field may be used to indicate that the WLAN module is operating in Closed Subscriber Group (CSG) mode, such that only authorized subscribers may connect to that WLAN module.

The WLAN module 13 may also transmit several beacon frames with different SSIDs (such as a first beacon frame including a Closed Subscriber Group (CSG) SSID and a second beacon frame including a public SSID). In this configuration, each SSID is different but corresponds to the same WLAN module 13, which allows different users to connect to the same WLAN module 13 with differing Quality of Service (QoS). For example, a first user may connect to WLAN module 13 via the CSG SSID and receive a relatively high QoS, whilst members of the public may also connect to the WLAN module 13 via the public SSID but receive a relatively low QoS. The relative QoS may be managed by the WLAN and router modules 13, 15 by setting up corresponding Virtual Local Area Networks (VLANs).

Returning to FIG. 2, the three CPEs each transmit one or more beacon frames. These will now be described in more detail. The first WLAN module A13 of the first CPE A10 transmits a first beacon frame, $\text{beacon}_1(A)_{CSG+LTE}$, and a second beacon frame, $\text{beacon}_2(A)_{Pub+LTE}$. The first beacon frame includes an SSID for CSG access (that is, so only authorized subscribers may successfully connect to the first WLAN module A13 via that SSID. The first beacon frame therefore includes an 'access type subfield' in the extended capabilities field indicating that the SSID is for CSG access only. The subscript 'CSG' in the term '$\text{beacon}_1(A)_{CSG+LTE}$' is used to indicate that the extended capabilities field includes this access type subfield.

The first beacon frame also includes a further subfield in the extended capabilities field, which, in this embodiment, includes the eCGI of the associated first cellular module A11 of the first CPE A10. This subfield is hereinafter known as the LTE identifier' subfield.

The second beacon frame, $\text{beacon}_2(A)_{Pub+LTE}$, transmitted by the first WLAN module A13 of the first CPE A10 includes an SSID for public access, and the extended capabilities field includes an access type subfield indicating that the SSID is for public access and an LTE identifier subfield including the eCGI of the associated first cellular module A11 of the first CPE A10.

The second WLAN module B13 of the second CPE B10 transmits a first and second beacon frame, $\text{beacon}_1(B)_{CSG+LTE}$ and $\text{beacon}_2(B)_{Pub+LTE}$, which have the same form as those transmitted by the first WLAN module A13 of the first CPE A10. However, the LTE identifiers for these beacon frames include the eCGI of the associated second cellular module B11 of the second CPE B10.

The third WLAN module C13 of the third CPE C10 transmits a first beacon frame, $\text{beacon}_1(C)_{CSG+LTE}$. The extended capabilities field of this beacon frame includes an access type identifier indicating that the SSID is for CSG access, and an LTE identifier subfield indicating the eCGI of the associated third cellular module C11 of the third CPE C10.

The fourth WLAN module D13 of the fourth CPE D10 transmits a first beacon frame, $\text{beacon}_1(D)_{CSG}$. The extended capabilities field of this beacon frame includes an access type identifier indicating that the SSID is for CSG access, but does not include an LTE identifier subfield.

The various beacon frames are summarized in the table, below.

TABLE 1

Table illustrating the contents of the beacon frames transmitted by the first, second, third and fourth WLAN modules

| Beacon Frame | Transmitted by | SSID | Access Type Subfield | LTE Identifier Subfield |
|---|---|---|---|---|
| beacon$_1$(A)$_{CSG+LTE}$ | First CPE A10 | MAC Address of first WLAN module A11 | CSG | eCGI of first cellular module A13 |
| beacon$_2$(A)$_{Pub+LTE}$ | First CPE A10 | MAC Address of first WLAN module A11 | Public | eCGI of first cellular module A13 |
| beacon$_1$(B)$_{CSG+LTE}$ | Second CPE B10 | MAC Address of second WLAN module B11 | CSG | eCGI of second cellular module B13 |
| beacon$_2$(B)$_{Pub+LTE}$ | Second CPE B10 | MAC Address of second WLAN module B11 | Public | eCGI of second cellular module B13 |
| beacon$_1$(C)$_{CSG+LTE}$ | Third CPE C10 | MAC Address of third WLAN module C11 | CSG | eCGI of third cellular module C13 |
| beacon$_2$(D)$_{Pub}$ | Fourth CPE D10 | MAC Address of fourth WLAN module B11 | Public | Not Present |

The first, second, third and fourth CPEs A10, B10, C10, D10 are all configured to implement an embodiment of a method of the present disclosure, which will now be described with reference to FIGS. 2 to 5. In this embodiment, dwellings A, B, C and D of network 1 are all in close proximity to each other such that they are reside within the coverage areas of the cellular and WLAN modules A11, B11, C11, D11, A13, B13, C13, D13 of the first, second, third and fourth CPEs A10, B10, C10, D10. This embodiment will follow the perspective of first CPE A10 from dwelling A.

The first WLAN module A13 of the first CPE A10 receives the beacon frames transmitted by the second, third and fourth WLAN modules B13, C13, D13 of the second, third and fourth CPEs B10, C10, D10 (S1). The first WLAN module A13 therefore receives an identifier for each nearby WLAN module, together with an identifier for each cellular module associated with those WLAN modules. These are stored in memory (such as memory A13b of WLAN module A13). This data is represented in the following table:

TABLE 2

Table illustrating data stored in memory A13b of WLAN module A13 of CPE A10

| Received Beacon Frame | SSID | Access Type Subfield | LTE Identifier Subfield |
|---|---|---|---|
| beacon$_1$(B)$_{CSG+LTE}$ | MAC Address of second WLAN module B11 | CSG | eCGI of second cellular module B13 |
| beacon$_2$(B)$_{Pub+LTE}$ | MAC Address of second WLAN module B11 | Public | eCGI of second cellular module B13 |
| beacon$_1$(C)$_{CSG+LTE}$ | MAC Address of third WLAN module C11 | CSG | eCGI of third cellular module C13 |
| beacon$_2$(D)$_{Pub}$ | MAC Address of fourth WLAN module D11 | Public | Not Present |

The first WLAN module A13 of first CPE A10 makes this data available for the first cellular module A11. In this embodiment, the first WLAN module A13 pushes a subset of this data to the cellular module A11, the subset being an association of WLAN module and cellular modules, and their respective identifiers. Accordingly, the first cellular module 11 of the first CPE A10 receives data indicating that the second WLAN module is associated with the second cellular module B13, and that the third WLAN module C11 is associated with the third cellular module C13 (no data relating to the fourth CPE D10 is sent to the first cellular module A11 as the first CPE A10 does not receive any information relating to an association between the fourth WLAN module D11 and a cellular module). This data is stored in memory A11b of the cellular module A11 of the first CPE A10. This data is represented in the following table:

TABLE 3

Table illustrating data stored in memory A11b of first cellular module A11 of CPE A10

| WLAN Module (Identifier) | Associated Cellular Module (Identifier) |
|---|---|
| Second WLAN module B11 (MAC B11) | Second cellular module B13 (eCGI B13) |
| Third WLAN module C11 (Mac C11) | Third cellular module C13 (eCGI C13) |

As will be described in more detail below, embodiments of the disclosure allow a CPE to use this information to enable its own cellular module to establish a cellular connection with any one of these base stations (i.e. a base station associated with WLAN modules of nearby CPEs), wherein the cellular connection is partly carried over a wireless connection between the WLAN modules of the two CPEs. For example, the information may be used to establish the cellular connection between the first cellular module A11 of the first CPE A10 and the second cellular module B11 of the second CPE B10 (the cellular connection thus comprising: a connection between the first cellular module A11 and the first WLAN module A13 of the first CPE A10, a connection between the first WLAN module A13 of the first CPE A10 and the second WLAN module B13 of the second CPE B10, and a connection between the second WLAN module B13 and the second cellular module B11 of the second CPE B10).

In this embodiment, an initial assessment of the QoS of the cellular connection between the first cellular module A11 of the first CPE A10 and those base stations contained in the subset of data from the first WLAN module A13 of the first CPE A10 is undertaken (S3). This is to determine whether a cellular connection over the WLAN connection would meet a threshold QoS before establishing such a connection. If it meets the threshold, then the cellular modules may connect using a part WLAN connection between the respective WLAN modules. If it does not meet the threshold, then the cellular modules may connect using the backhaul connection in the conventional manner.

In this embodiment, the first CPE A10 tests the connections between the first cellular module A11 and those of the second and third CPE B10, C10, and determines that the connection with the second cellular module B11 meets the threshold but the connection with the third cellular module C11 does not. Accordingly, the data stored in memory A11b in the cellular module A11 of the first CPE A10 is updated with the results of this assessment, as illustrated in the table below.

TABLE 4

Table illustrating data stored in memory
A11b of first cellular module A11
CPE A10, including QoS data

| WLAN Module (Identifier) | Associated Cellular Module (Identifier) | QoS > Threshold? |
|---|---|---|
| Second WLAN module B11 (MAC B11) | Second cellular module B13 (eCGI B13) | Pass |
| Third WLAN module C11 (Mac C11) | Third cellular module C13 (eCGI C13) | Fail |

Examples of the first CPE A10 establishing a cellular connection with CPEs B10, C10 will now be described. In a first example, the first CPE A10 attempts to establish a cellular connection with the second CPE B10. This may be in response to receiving a measurement report from a UE indicating that the UE should handover to the second cellular module B11 of the second CPE B10. The first CPE A10 consults the data set stored in memory module A11b of the first cellular module A11 to determine if the eCGI of the second CPE B10 is present as one of the identifiers in the data set (and thus whether a cellular connection can be made over a WLAN connection between the associated WLAN modules) and, if so, whether the QoS of the connection passes a threshold. As noted above, the eCGI of the second cellular module B11 of the second CPE B10 is present in the data set and the QoS passes a threshold. Accordingly, the connection is established over the WLAN link (S4). This is achieved in the following manner.

Firstly, the first cellular module A11 of the first CPE A10 determines the IP address of the second cellular module B11 of the second CPE B10. Accordingly, the first cellular module A11 of the first CPE A10 sends an S1 Application Protocol (S1-AP) eNodeB Configuration Transfer message, including the eCGI of the second cellular module B11 of the second CPE B10, to request an X2 Tunnel Configuration from the MME. This is sent to the MME via the backhaul A19 over an IPsec tunnel. The MME uses the eCGI to interrogate the second cellular module B11 of the second CPE B10 for its X2 Tunnel Configuration (using an S1-AP MME Configuration Transfer message), and the second cellular module B11 of the second CPE B10 responds with the requested X2 configuration information. This includes the IP address of the second cellular module B11 (which was stored in memory B11b). The X2 configuration information is forwarded by the MME to the first cellular module A11 of the first CPE A10.

The first cellular module A11 of the first CPE A10 may now establish an X2 connection with the second cellular module B11 of the second CPE B10 using the obtained X2 configuration information. As discussed above, this connection is to be made in part by a WLAN connection between the associated first and second WLAN modules A13, B13 of the first and second CPEs A10, B10. The first CPE A10 therefore uses the identifier for the second WLAN module B11 (the association being recorded in the data stored in memory A11b of the first cellular module A13) to establish the wireless networking part of the connection. Once this connection is established, the first and second cellular modules A11, B11 of the first and second CPE A10, B10 exchange X2-AP: X2 Setup Request messages to establish an X2 connection. Any data packet transmitted over this link is encapsulated within a WLAN data frame (and are therefore capped to ensure they do not exceed the maximum packet size).

A second example will now be discussed, in which the first cellular module A11 of the first CPE A10 attempts to establish a connection with the third cellular module C11 of the third CPE C10. Again, this may be in response to a measurement report from a UE indicating that the UE should handover to the third cellular module C11. The first CPE A10 consults the data set to determine if the eCGI of the third cellular module C11 of the third CPE C10 is on the list (and thus whether a cellular connection can be made over a WLAN connection between the associated WLAN modules) and, if so, whether the QoS of the connection passes a threshold. As noted above, the eCGI of the third cellular module C11 of the third CPE C10 is present in the data set, but the QoS does not meet the threshold. Accordingly, the first CPE A10 establishes the cellular connection between the first and third cellular modules A11, C11 in the conventional manner via the backhaul A19, C19 using an IPsec tunnel (S5). If the backhaul is not available for any reason, then the first CPE A10 can establish the cellular connection over the WLAN connection between the associated WLAN modules in the manner described in the first example above.

In the embodiment above, the CPEs A10, B10, C10, D10 transmit beacon frames which contain the eCGI of the associated cellular module A11, B11, C11, D11. The skilled person will understand that the same advantages may be realized using other identifiers, such as the PCI. In an alternative embodiment, the CPEs A10, B10, C10, D10 may transmit the IP address of their respective cellular modules A11, B11, C11, D11 in the beacon frames. This allows a cellular module of another CPE to connect to it over a WLAN link (as in the first example of the first embodiment above), without having to exchange X2 configuration messages over the backhaul. This therefore has a further benefit in that an X2 connection may be established between two cellular modules of two CPEs when one of their backhauls has failed (assuming the CPEs may communicate directly via their WLAN modules).

Furthermore, the skilled person will understand that the cellular module identifier may be embedded in the beacon frame in other manners. For example, a dedicated beacon frame may be transmitted, which does not allow a UE to connect to the WLAN module but instead simple carries information on the association between the WLAN and cellular modules and their identifiers. The skilled person will also understand that any type of message, existing or future, which may be adapted to contain this information, may be used instead.

The skilled person will understand that a cellular connection between two cellular modules may be established in other ways than the example given above. For example, the cellular module of a CPE may transmit its own identifier (e.g. the eCGI) and also an identifier for an associated WLAN module. This information may be transmitted as part of its System Information Block (SIB). When another cellular module receives this information, it can populate a data set indicating the WLAN modules associated with neighboring cellular modules and their respective identifiers. A cellular connection may then be established over the WLAN link by connecting the two WLAN modules using the identifying information.

In the above embodiments, the CPEs maintain data in memory regarding nearby CPEs, the SSIDs of their WLAN modules, and identifying information of their cellular modules. The skilled person will understand that this may be stored in any part of the CPE. Furthermore, it is preferable that this data is updated periodically as the surrounding environment may change over time.

The skilled person will also understand that the CPEs may be a complete unit comprising both the WLAN and cellular modules, or alternatively the WLAN and cellular modules may be distinct entities (such that the CPE is a distributed architecture comprising all modules within a particular area or dwelling).

In the above embodiments, the cellular modules of the CPEs implement the LTE protocol. However, the skilled person will understand that any form of cellular connection between two base stations may be established in the manner of the present invention.

In the above embodiments, the CPEs have a WLAN module for communicating wirelessly. However, the skilled person will understand that the CPEs may implement any other suitable wireless networking technique (e.g. microwave communications) to carry the cellular connection between two CPEs.

The skilled person will understand that any combination of features is permissible within the scope of the invention, as claimed.

The invention claimed is:

1. A method for establishing a connection between a first and a second base station, the method comprising:
   a first base station receiving a first identifier for a second base station and a second identifier for a second wireless local area networking module associated with the second base station, wherein the first identifier uniquely identifies the second base station and the second identifier uniquely identifies the second wireless local area networking module;
   based on the first identifier and the second identifier, determining if a first wireless local area networking module associated with a first base station is communicatively connectable to the second wireless local area networking module associated with a second base station; and
   the first base station establishing a cellular connection with the second base station using the first identifier and the second identifier.

2. The method as claimed in claim 1, wherein the first base station establishes the cellular connection with the second base station over a wireless local area networking connection between the first wireless local area networking module and the second wireless local area networking module.

3. The method as claimed in claim 1, further comprising:
   determining the Quality of Service (QoS) of the cellular connection between the first and second base stations over a wireless local area networking connection.

4. The method as claimed in claim 3, wherein the first base station establishes the cellular connection with the second base station over the wireless local area networking connection between the first wireless local area networking module and the second wireless local area networking module if the QoS is above a threshold.

5. The method as claimed in claim 1, further comprising:
   determining the Quality of Service, QoS, of the cellular connection between the first base station and the second base station over a wireless networking connection,
   wherein the first base station establishes a cellular connection with the second base station over a backhaul connection if the QoS is below a threshold.

6. The method as claimed in claim 1, further comprising:
   the first wireless local area networking module receiving a wireless local area networking signal from the second wireless local area networking module, the wireless local area networking signal including the identifier for the second base station associated with the second wireless local area networking module.

7. The method as claimed in claim 6, wherein the identifier is an Internet Protocol address for the second base station.

8. The method as claimed in claim 1, further comprising:
   the first base station receiving a cellular signal from a second base station, the cellular signal including the identifier for the second wireless local area networking module associated with the second base station.

9. A non-transitory computer-readable storage medium storing a computer program or suite of computer programs which upon execution by a computer system performs the method of claim 1.

10. A first base station comprising:
    a transceiver adapted to receive a first identifier for a second base station and a second identifier for a second wireless local area networking module associated with the second base station, wherein the first identifier uniquely identifies the second base station and the second identifier uniquely identifies the second wireless local area networking module; and
    a processor adapted to determine if a first wireless local area networking module associated with the first base station is communicatively connectable to the second wireless local area networking module associated with the second base station,
    wherein the transceiver is further adapted to establish a cellular connection with the second base station using the first identifier and the second identifier.

11. The first base station as claimed in claim 10, wherein the transceiver is adapted to send data for the cellular connection to the first wireless local area networking module for transmission over a wireless local area networking connection between the first wireless local area networking module and the second wireless local area networking module.

12. The first base station as claimed in claim 10, wherein the processor is adapted to determine a Quality of Service (QoS) of the cellular connection with the second base station over the wireless local area networking connection.

13. The first base station as claimed in claim 12, wherein the transceiver is adapted to send data for the cellular connection to the first wireless local area networking module for transmission over the wireless local area networking connection between the first wireless local area networking module and the second local area wireless networking module if the QoS is above a threshold.

14. The first base station as claimed in claim 10, wherein the processor is adapted to determine a Quality of Service (QoS) of the cellular connection with the second base station over the wireless local area networking connection, and the transceiver is adapted to send data for the cellular connection with the second base station over a backhaul connection if the QoS is below a threshold.

15. The first base station as claimed in claim 10, wherein the transceiver is adapted to receive a cellular signal from the second base station, the cellular signal including the identifier for the second wireless local area networking module associated with the second base station.

16. A Customer Premises Equipment (CPE) comprising the base station of claim 10, and the first wireless local area networking module, wherein the first wireless local area networking module includes:
 a transceiver adapted to receive a wireless local area networking signal from a second wireless local area networking module, the wireless local area networking signal including an identifier for the second base station associated with the second wireless local area networking module; and
 memory adapted to store the identifier for the second base station.

* * * * *